(12) United States Patent
Inoguchi et al.

(10) Patent No.: US 7,749,606 B2
(45) Date of Patent: *Jul. 6, 2010

(54) ARTICLE WITH ORGANIC-INORGANIC COMPOSITE FILM AND PROCESS FOR PRODUCING THE SAME

(75) Inventors: Kazuyuki Inoguchi, Tokyo (JP); Teruyuki Sasaki, Tokyo (JP); Kazutaka Kamitani, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/594,936

(22) PCT Filed: Mar. 31, 2005

(86) PCT No.: PCT/JP2005/006337

§ 371 (c)(1), (2), (4) Date: Sep. 28, 2006

(87) PCT Pub. No.: WO2005/095101

PCT Pub. Date: Oct. 13, 2005

(65) Prior Publication Data

US 2007/0212571 A1 Sep. 13, 2007

(30) Foreign Application Priority Data

Mar. 31, 2004 (JP) ............................. 2004-104503
Sep. 17, 2004 (JP) ............................. 2004-271618
Sep. 17, 2004 (JP) ............................. 2004-271624

(51) Int. Cl.
B32B 27/18 (2006.01)
B32B 27/06 (2006.01)
C07F 7/18 (2006.01)
C07F 7/14 (2006.01)

(52) U.S. Cl. ........................ 428/446; 428/391; 428/405; 428/447; 427/96.6; 106/287.13; 106/287.14

(58) Field of Classification Search ........................ None
See application file for complete search history.

(56) References Cited

U.S. PATENT DOCUMENTS

| | | | |
|---|---|---|---|
| 3,725,079 A * | 4/1973 | Mackey | ........................ 430/637 |
| 4,277,525 A | 7/1981 | Nakayama et al. | |
| 4,865,649 A | 9/1989 | Kashiwagi et al. | |
| 5,424,130 A | 6/1995 | Nakanishi et al. | |
| 5,518,810 A | 5/1996 | Nishihara et al. | |
| 6,020,419 A * | 2/2000 | Bock et al. | ........................ 524/590 |
| 6,465,108 B1 | 10/2002 | Kamitani et al. | |
| 6,589,457 B1 | 7/2003 | Li et al. | |
| 6,620,514 B1 * | 9/2003 | Arpac et al. | ........................ 428/447 |
| 6,855,396 B1 * | 2/2005 | Mennig et al. | ........................ 428/144 |
| 2003/0027967 A1 | 2/2003 | Hori et al. | |
| 2003/0129421 A1* | 7/2003 | Terauchi et al. | ........................ 428/447 |
| 2003/0146415 A1 | 8/2003 | Minami et al. | |

FOREIGN PATENT DOCUMENTS

| | | |
|---|---|---|
| EP | 0 358 011 A2 | 3/1990 |
| EP | 0 358 011 B1 | 3/1990 |
| EP | 1 541 536 A1 | 6/2005 |
| JP | 50-127930 | 10/1975 |
| JP | 55-034258 | 3/1980 |
| JP | 63-168470 | 7/1988 |
| JP | 63-241076 | 10/1988 |
| JP | 63-268722 | 11/1988 |
| JP | 3-56535 | 3/1991 |
| JP | 3-212451 | 9/1991 |
| JP | 4-338137 | 11/1992 |
| JP | 5-85714 | 4/1993 |
| JP | 6-52796 | 2/1994 |
| JP | 8-27422 | 1/1996 |
| JP | 8-295844 | 11/1996 |
| JP | 11-269657 | 10/1999 |
| JP | 2001-079980 A | 3/2001 |
| JP | 2002-88304 | 3/2002 |
| JP | 2002-166488 A | 6/2002 |
| JP | 2002-338304 | 11/2002 |
| JP | 2002-348542 | 12/2002 |
| JP | 2002348542 | * 12/2002 |
| JP | 2003-277537 | 10/2003 |
| JP | 2003277537 | * 10/2003 |
| WO | WO 99/52964 | * 10/1999 |
| WO | WO 01/30922 A | 5/2001 |
| WO | 02/053345 | 7/2002 |
| WO | WO 02/074447 | 9/2002 |
| WO | WO 2004/011381 A | 2/2004 |

OTHER PUBLICATIONS

Specification for co-pending U.S. Appl. No. 10/594,606.
Form PTO-892, dated Jul. 9, 2008, from co-pending U.S. Appl. No. 10/594,606, filed Sep. 28, 2006.
Prené, P. et al. "Preparation of a Sol-Gel Broadband Antireflective and Scratch-Resistant Coating for Amplifier Blastshields of the French Laser LIL", Journal of Sol-Gel Science and Technology, vol. 19, 2000, pp. 533-537.

(Continued)

*Primary Examiner*—David R Sample
*Assistant Examiner*—Nicole T Gugliotta
(74) *Attorney, Agent, or Firm*—Hamre, Schumann, Mueller & Larson, P.C.

(57) ABSTRACT

An article with an organic-inorganic composite film that contains silica as its main component and does not separate from the substrate after the Taber abrasion test prescribed in Japanese Industrial Standards (JIS) R 3212. This composite film is formed of a coating solution containing a hydrophilic organic polymer by a sol-gel process. In this solution, for example, the amount of silicon alkoxide exceeds 3 mass % in terms of a $SiO_2$ concentration. When the coating solution contains a phosphorus source, the molality of protons is 0.0001 to 0.2 mol/kg while the number of moles of water is at least four times the total number of moles of silicon atoms contained in the silicon alkoxide. This sol-gel process allows a film with excellent mechanical strength to be obtained even when the substrate is not heated up to a temperature exceeding 400° C. and the film thickness exceeds 250 nm.

11 Claims, No Drawings

OTHER PUBLICATIONS

Wen, J. et al. "Abrasion Resistant Inorganic/Organic Coating Materials Prepared by the Sol-Gel Method", Journal of Sol-Gel Science and Technology, vol. 5, No. 2, Jan. 1, 1995, pp. 115-126.

Wen, J. et al. "Organic/Inorganic Hybrid Network Materials by the Sol-Gel Approach", Chemistry of Materials, vol. 8, No. 8, Jan. 1, 1996, pp. 1667-1687.

* cited by examiner

ARTICLE WITH ORGANIC-INORGANIC COMPOSITE FILM AND PROCESS FOR PRODUCING THE SAME

TECHNICAL FIELD

The present invention relates to an article with an organic-inorganic composite film, and a process for producing the same. Particularly, the present invention relates to an article with a film that is formed by a sol-gel process and contains an organic material while having excellent mechanical strength, and to a process for producing the same.

BACKGROUND ART

Generally, glass materials are hard and also can be used in the form of films that coat substrates. However, when employing a melting method, a high temperature treatment is necessary for obtaining a vitreous film. This limits the materials of which the substrates and films can be made.

The sol-gel process is a process of obtaining an oxide in a solid state by: using a solution of an organic or inorganic compound of metal as a starting material; rendering the solution into a sol in which fine particles of metal oxides or hydroxides have dissolved, through the hydrolysis reaction and polycondensation reaction of the compound contained in the solution; further gelling and solidifying the sol; and heating this gel if necessary.

The sol-gel process allows vitreous films to be produced at lower temperatures. Processes of forming silica-based films by the sol-gel process are disclosed in JP55 (1980)-034258A, JP63 (1988)-241076A, JP8 (1996)-27422A, JP63 (1988)-268772A, JP2002-088304A, JP5 (1993)-85714A, JP6 (1994)-52796A, JP63 (1988)-168470A, and JP11 (1999)-269657A, for example.

Generally, the silica-based films formed by the sol-gel process have lower mechanical strength than that of vitreous films obtained by the melting method.

JP11 (1999)-269657A discloses a process for producing a silica-based film by applying an alcohol solution that is used as a coating solution to a substrate. The alcohol solution contains 0.010 to 3 wt %, in terms of silica, of at least one selected from silicon alkoxide and hydrolysate thereof (including partial hydrolysate), 0.0010 to 1.0N of acid, and 0 to 10 wt % of water.

The silica-based film obtained by this process has strength to an extent that allows the film to withstand the dry abrasion test. It probably cannot be said that the silica-based film has sufficiently high strength, but it has high mechanical strength for a film obtained by the sol-gel process. However, in the case of the silica-based film that can be formed by the process disclosed in JP11(1999)-269657A, the thickness thereof is limited to 250 nm maximum when consideration is given to obtaining an appearance that is good enough for practical use. The thickness of the silica-based film that is formed by the sol-gel process is generally around 100 to 200 nm.

As is disclosed in JP63 (1988)-168470A, a coating solution containing colloidal silica added thereto allows a film with a thickness exceeding 1 μm to be formed through a single application. However, the film obtained using this coating solution has a pencil hardness of merely around 8H and does not have sufficiently high mechanical strength.

When the coating solution is applied twice, the film obtained thereby has increased thickness. However, the silica-based film thus obtained does not have high characteristics in mechanical strength, particularly abrasion resistance. This is mainly because the coating solution is applied twice, which induces cracks in the film.

Consequently, it is difficult to obtain a silica-based film that has a thickness exceeding 250 nm and has excellent mechanical strength.

A technique of forming an organic-inorganic composite film by the sol-gel process has been proposed. The film contains an inorganic material and an organic material that are composited. The sol-gel process is characterized by film formation that is carried out at a lower temperature. Accordingly, it allows a silica-based film containing an organic material to be formed. Organic-inorganic composite films that are formed by the sol-gel process are disclosed in JP2574049B, JP2680434B, and JP2002-338304A, for example.

In order to improve the mechanical strength of the silica-based film that is formed by the sol-gel process, it is desirable to heat-treat the silica-based film at 450° C. or higher. However, when an organic-inorganic composite film is heat-treated at a high temperature of this level, the organic material in the film will decompose. The restriction that the film must be heat-treated at a temperature in the range that does not cause the organic material to decompose limits the improvement in mechanical strength of the film to be formed, not only in the sol-gel process but also in the liquid-phase film formation methods other than that. Hence, it has been considered that it is difficult to form a silica-based film that has excellent mechanical strength when the film contains an organic material.

Conventionally, it also has been considered that it is even more difficult to form a silica-based film that is thick and has excellent mechanical strength when the film contains an organic material.

DISCLOSURE OF INVENTION

The present invention provides a silica-based film that has excellent mechanical strength while containing an organic material.

The present invention provides an article with an organic-inorganic composite film. The article includes a substrate and an organic-inorganic composite film that is formed on the surface of the substrate and contains an organic material and an inorganic oxide. The organic-inorganic composite film contains silica as the inorganic oxide. The organic-inorganic composite film contains the silica as its main component. The organic-inorganic composite film does not separate from the substrate after the Taber abrasion test prescribed in Japanese Industrial Standards (JIS) R 3212 that is carried out with respect to the surface of the organic-inorganic composite film.

In this description, the term "main component" denotes a component whose content is the highest. The Taber abrasion test according to JIS R 3212 can be carried out using a commercially available Taber abrasion tester. This test is an abrasion test that is carried out at a rotation number of 1000, with a load of 500 g being applied, as prescribed in the JIS.

From another aspect, the present invention provides a process for producing an article with an organic-inorganic composite film. The article includes a substrate and an organic-inorganic composite film that is formed on the surface of the substrate and contains an organic material and an inorganic oxide. The organic-inorganic composite film contains silica as the inorganic oxide, and it contains the silica as its main component. The process includes: applying a film-forming solution for forming the organic-inorganic composite film to the surface of the substrate; and removing at least a part of a fluid component contained in the film-forming solution from the film-forming solution that has been applied to the substrate.

In the production process of the present invention, the film-forming solution contains silicon alkoxide, strong acid, water, and alcohol. The film-forming solution further contains a hydrophilic organic polymer to be at least a part of the organic material, as at least a part of the strong acid or as a component other than the strong acid. The silicon alkoxide has a concentration exceeding 3 mass % in terms of a $SiO_2$ concentration when silicon atoms contained in the silicon alkoxide are expressed as $SiO_2$. Furthermore, a) in the case where the film-forming solution contains a phosphorus source, the strong acid has a concentration in the range of 0.0001 to 0.2 mol/kg in terms of the molality of protons that is obtained, assuming that the protons have dissociated completely from the strong acid, and b) in the case where the film-forming solution contains no phosphorus source, the strong acid has a concentration in the range of 0.001 to 0.2 mol/kg in terms of the molality of protons that is obtained, assuming that the protons have dissociated completely from the strong acid, and the silicon alkoxide has a concentration of lower than 13 mass % in terms of the $SiO_2$ concentration.

In the production process of the present invention, the number of moles of the water is at least four times the total number of moles of the silicon atoms contained in the silicon alkoxide. Moreover, in the production process of the present invention, at least a part of the fluid component contained in the film-forming solution that has been applied to the substrate is removed, with the substrate being maintained at a temperature of 400° C. or lower.

According to the present invention, an organic-inorganic composite film that has excellent mechanical strength even when having a thickness exceeding 250 nm, can be formed by the sol-gel process. The organic-inorganic composite film of the present invention can have excellent abrasion resistance that is comparable to that of a glass sheet obtained by the melting method even though it contains the organic material.

According to the production process of the present invention, a film that has a thickness exceeding 250 nm, for example, and that also has excellent mechanical strength can be formed by single application of the film-forming solution (coating solution).

DESCRIPTION OF THE INVENTION

First, the reason why the mechanical strength of the film is improved by the present invention is described below.

In the case of the sol-gel process using silicon alkoxide as a starting material, the silicon alkoxide in the film-forming solution (coating solution) forms an oligomer having siloxane bonds through the hydrolysis reaction and polycondensation (dehydration condensation) reaction in the presence of water and a catalyst in the coating solution, and thereby the coating solution is changed into a sol state.

The coating solution in the sol state is applied to the substrate and then an organic solvent such as alcohol and water volatilize from the coating solution that has been applied. In this drying step, the oligomer is concentrated to have a higher molecular weight and eventually loses flowability. Thus a film of a semisolid gel is formed on the substrate. Immediately after gelation, gaps that are present in the network of the siloxane bonds are filled with the organic solvent and water. When the solvent and water volatilize from the gel, the siloxane polymer contracts and thereby the film is cured.

In the case of a gel obtained by the conventional sol-gel process, gaps that have remained after the organic solvent and water are removed are not filled completely and remain as pores even after a heat treatment is carried out at a maximum temperature of around 400° C. When the pores remain, the film cannot have sufficiently high mechanical strength. Hence, conventionally, it has been considered that in order to obtain a sufficiently hard film, a heat treatment has to be carried out at a high temperature that exceeds 400° C., for example, at least 450° C. and preferably at least 500° C.

The relationship between the reaction and the temperature in the heat treatment of a silica-based film that is formed by the sol-gel process is described further in detail. When the heat treatment is carried out at around 100 to 150° C., the solvent and water in the coating solution evaporate. In the case where the heat treatment is carried out at around 250 to 400° C., when an organic material is contained in the raw material, the organic material decomposes and evaporates. When the heat treatment is carried out at a temperature exceeding 400° C., usually no organic materials remain in the film. Furthermore, when the heat treatment is carried out at a temperature of approximately 500° C. or higher, the gel skeleton contracts and thereby the film becomes dense.

The size of the gaps of the network that remain after gelation depends on the form of polymerization of silicon alkoxide in the solution.

The form of polymerization varies depending on pH of the solution. In an acidic solution, the oligomer of silicon alkoxide tends to grow linearly. When such a solution is applied to the substrate, the linear oligomer is folded and thereby forms a network structure. The film obtained thereby is a dense film having relatively smaller gaps. However, since the film is solidified, with the linear polymer being folded, the microstructure is not strong. Therefore, the film tends to crack when the solvent and water volatilize from the gaps.

On the other hand, in an alkaline solution, spherical oligomers tend to grow. When such a solution is applied to the substrate, a structure in which spherical oligomers are joined to each other is formed. Accordingly, the film obtained thereby has relatively large gaps. Since these gaps are formed through bonding and growth of the spherical oligomers, the film tends not to crack when the solvent and water volatilize from the gaps.

The present invention is based on the following knowledge. That is, even when thick, a crack-free dense film can be formed under certain conditions when the concentration of strong acid, water content, etc. are adjusted appropriately in the acidic region that allows a relatively dense film to be formed. This knowledge further was developed to complete the present invention.

Silanol has an isoelectric point of 2. This denotes that silanol can exist most stably in the coating solution when the solution has a pH of 2. That is, even if a large amount of hydrolyzed silicon alkoxide exists in the solution, the probability that oligomers are formed through the dehydration condensation reaction is very low when the solution has a pH of about 2. Consequently, hydrolyzed silicon alkoxide can exist in the form of monomers or in a lower degree of polymerization in the coating solution.

In the range where the pH is around 2, one alkoxyl group per molecule is hydrolyzed in silicon alkoxide and thereby the silicon alkoxide becomes silanol and is stabilized in this state. For example, in the case of tetraalkoxysilane that has four alkoxyl groups, one of the alkoxyl groups is hydrolyzed and thereby it becomes silanol and is stabilized in this state.

The solution will have a pH of around 3 to 1 when a strong acid is added to the sol-gel solution so that the molality (mass molality) of protons (hereinafter also referred to simply as "proton concentration") that is obtained, assuming that the protons have dissociated completely from the strong acid, is approximately 0.001 to 0.1 mol/kg. When the pH is adjusted in this range, silicon alkoxide can exist in the coating solution stably as monomeric or lower polymerized silanol. A pH of around 2 denotes a relatively highly acidic state. In order to obtain such a pH, it is necessary to use a strong acid.

The coating solution of the present invention contains a mixed solvent of water and alcohol, but another solvent can be added thereto if necessary. Similarly in the case of using such a mixed solvent, a solution having a pH of around 2 can be obtained by using a strong acid and adding it so that the molality of protons that is obtained, assuming that the protons have dissociated completely from the strong acid, is 0.001 to 0.2 mol/kg.

For the calculation of the molality of protons, protons of the acid to be used whose acid dissociation constant in water is 4 or higher do not need to be taken into account. For instance, since the acid dissociation constant of acetic acid, which is a weak acid, in water is 4.8, the protons of the acetic acid are not included in the proton concentration even when acetic acid is contained in the coating solution.

Furthermore, for example, phosphoric acid has three dissociation stages and three protons per molecule can be dissociated. The dissociation constant at the first stage is 2.15, which allows the phosphoric acid to be considered as a strong acid. However, the dissociation constant at the second stage is 7.2 and that at the third stage is further higher. Hence, the proton concentration that is determined, assuming that the protons have dissociated from the strong acid, can be calculated on the assumption that only one proton dissociates from one molecule of the phosphoric acid. The phosphoric acid from which one proton has dissociated is no longer a strong acid. Accordingly, the dissociation of protons at and after the second stage does not need to be taken into account. In this description, the strong acid denotes, specifically, an acid having protons whose acid dissociation constant in water is lower than 4.

The reason why the proton concentration is defined as a concentration that is determined when the protons have dissociated completely from the strong acid, as described above, is as follows. That is because in a mixed solution of water and an organic solvent such as alcohol, it is difficult to determine the degree of dissociation of a strong acid accurately.

When the coating solution is applied to the substrate surface while being maintained at a pH of around 1 to 3 and then is dried, the hydrolysis is not completed and the film is filled densely with silicon alkoxide that is in a lower polymerized state. Accordingly, a considerably dense film with finer pores can be obtained.

Although this film is dense, the hardness thereof does not become higher than a certain degree due to insufficient hydrolysis even when it is heated at 200 to 300° C. Hence, water is added to silicon alkoxide excessively so that the hydrolysis of silicon alkoxide is facilitated not only before the application of the coating solution but also after the application. In the state where hydrolysis progresses readily, the film is cured even if it is not heated to a high temperature. Specifically, water having a maximum number of moles that is required for hydrolysis, i.e. a number of moles that is at least four times the total number of moles of silicon atoms in silicon alkoxide, is added.

In the drying step, water evaporates in parallel with the volatilization of the solvent. When this is taken into consideration, it is further preferable that the number of moles of water be more than four times, for example, 5 to 20 times the total number of moles of the silicon atoms.

In silicon alkoxide, a maximum of four alkoxyl groups can bind to one silicon atom. Alkoxide that has a small number of alkoxyl groups requires a smaller number of moles of water for hydrolysis. Furthermore, even in the case of tetraalkoxysilane in which four alkoxyl groups have bound to a silicon atom, the total number of moles of water required for hydrolysis of a polymerized material thereof (that is commercially available as, for instance, "Ethyl silicate 40" manufactured by COLCOAT Co., Ltd.) is less than four times that of the silicon atoms (the number of moles of water required for hydrolysis stoichiometrically is (2n+2) moles where n denotes the number of moles of Si contained in the polymerized material ($n \geqq 2$)). The higher the polymerization degree of the alkoxysilane material to be used, the smaller the number of moles of water required for hydrolysis. Hence, practically, the number of moles of water required for the hydrolysis of silicon alkoxide may be less than four times the total number of moles of silicon atoms in the silicon alkoxide. In the present invention, however, in view of the fact that addition of excess water is preferred, water is added in a number of moles at least four times the total number of moles of silicon atoms.

Addition of water whose number of moles exceeds that required for hydrolysis stoichiometrically accelerates the hydrolysis reaction of silicon alkoxide in the drying step. The variation of pH of the applied solution from the above-mentioned range due to volatilization of the solvent and vaporization of water also is one of the factors that accelerate hydrolysis. By forming a dense film and allowing the hydrolysis and polycondensation reaction to progress sufficiently as described above, a hard film is formed. As a result, a film with excellent mechanical strength can be obtained through a heat treatment that is carried out at a lower temperature than that employed conventionally.

The use of this method makes it possible to obtain a silica-based film that has excellent mechanical strength although being thick. A thick film can be obtained by preparing the coating solution so that the concentration of silicon alkoxide is relatively high, for example, the silicon atoms contained in the silicon alkoxide exceeds 3 mass % in terms of the $SiO_2$ concentration when the silicon atoms are expressed as $SiO_2$.

Furthermore, in the present invention, in order to minimize the shrinkage of the film that is caused by evaporation of water and the solvent, a hydrophilic organic polymer is added. The hydrophilic organic polymer prevents the occurrence of cracks that may accompany the evaporation of fluid components in the coating solution that has been applied. The hydrophilic organic polymer lies between silica particles produced in the solution and thereby alleviates the effect of film shrinkage that accompanies the evaporation of fluid components. Conceivably, the addition of the hydrophilic organic polymer allows the film to follow flexibly the structural change that occurs when the film is cured and shrinks and thereby the stress in the film is alleviated. Conventionally, an organic material is a mere factor for limiting the heat-treatment temperature. In the present invention, however, the organic material serves to maintain the mechanical strength of the film by preventing the film from shrinking.

In the process of the present invention, since the film can be heated at a lower temperature than that employed conventionally, the hydrophilic organic polymer remains in the film even after heating. The addition of the hydrophilic organic polymer makes it possible to obtain a film that has excellent mechanical strength even when the film has a further increased thickness.

It is advantageous that the hydrophilic organic polymer is added to the coating solution beforehand. In an organic-inorganic composite film formed of the coating solution, it is conceivable that an organic material and an inorganic material have been compounded on the molecular level.

With reference to various experimental results, the hydrophilic organic polymer seems to prevent the film from becoming porous by preventing the growth of silica particles that are formed through the sol-gel reaction.

Examples of preferred hydrophilic organic polymers include polymers that include polyoxyalkylene groups. Examples of the hydrophilic organic polymers including polyoxyalkylene groups include surfactants of polyether and polyethylene glycol.

With further studies made, it was proved that the mechanical strength of the film improved readily when the coating solution contained a phosphorus source, for example, phosphoric acid, phosphate, or phosphate ester. When a phosphorus source is added, a film with excellent mechanical strength can be obtained even if the range of the proton concentration of the coating solution is wider than the range described above. As a result of some experiments, it has been proved that the proton concentration can be 0.0001 to 0.2 mol/kg in a coating solution containing a phosphorus source.

Furthermore, the addition of a phosphorus source allows the film to maintain good mechanical strength even when the film has a further increased thickness. In the case where no phosphorus source is contained, when the concentration of silicon alkoxide in the coating solution is 13 mass % or higher in terms of the $SiO_2$ concentration, the film becomes excessively thick and thereby the mechanical strength thereof deteriorates. On the other hand, when a phosphorus source is contained, the concentration of silicon alkoxide in the coating solution does not need to be limited to the value mentioned above. In this case, the concentration can be 30 mass % or lower. Of course, the concentration of silicon alkoxide can be limited to a range from at least 3 mass % to lower than 13 mass % even when a phosphorus source is contained. The preferred concentration of silicon alkoxide is 3 mass % to 9 mass % when no phosphorus source is contained.

Details of the behavior of phosphorus in the film are not clear at the present. However, with reference to the experimental results obtained up to now, it is conceivable that phosphorus contributes to the improvement in adhesion between the film and the substrate.

With the improvement of the sol-gel process described above, the present invention provides an article with an organic-inorganic composite film formed on a substrate. The organic-inorganic composite film does not separate from the substrate even after having been subjected to the Taber abrasion test prescribed in JIS R 3212 although it contains an organic material.

The thickness of the organic-inorganic composite film is more than 250 nm but not more than 5 µm, preferably more than 300 nm but not more than 5 µm, more preferably 500 nm to 5 µm, and particularly preferably 1 µm to 5 µm. The thickness of the organic-inorganic composite film may be 4 µm or less.

The present invention also allows a portion that has been subjected to the Taber abrasion test to have a haze ratio of 4% or lower, further 3% or lower after the Taber abrasion test. This mechanical strength is comparable to that of a vitreous film obtained by the melting method.

In the organic-inorganic composite film of the present invention, it is preferable that the content of the organic material be 0.1 to 60%, particularly 2 to 60%, with respect to the total mass of the organic-inorganic composite film. Preferably, the organic-inorganic composite film of the present invention contains a hydrophilic organic polymer as the organic material. It is preferable that the hydrophilic organic polymer contain a polyoxyalkylene group (a polyalkylene oxide structure). The organic-inorganic composite film of the present invention may contain phosphorus.

The organic-inorganic composite film of the present invention may contain fine particles. Addition of fine particles allows the film to be provided with a function. Examples of the fine particles include, but are not particularly limited to, fine particles of an organic material, fine particles of electrically conductive oxide, etc. Examples of the fine particles of an organic material include latex.

According to the present invention, it also is possible to form an organic-inorganic composite film in which a portion that has been subjected to the Taber abrasion test has a haze ratio of 4% or lower, preferably 3% or lower after the Taber abrasion test, with the content of the fine particles being at least 1 mass %.

In the process of the present invention, a coating solution is used that contains silicon alkoxide, strong acid, water, and alcohol and further contains a hydrophilic organic polymer. Generally, the hydrophilic organic polymer is added as a component other than the strong acid. However, a polymer that serves as a strong acid, for instance, a polymer containing a phosphoester group may be added as at least a part of the strong acid.

The silicon alkoxide is preferably at least one selected from tetraalkoxysilane and a material made by polymerization of tetraalkoxysilane. The silicon alkoxide and the polymerized material thereof may contain a hydrolyzed alkoxyl group.

The concentration of the silicon alkoxide is at least 3 mass % but less than 13 mass %, preferably 3 mass % to 9 mass %, in terms of the $SiO_2$ concentration when silicon atoms contained in the silicon alkoxide are expressed as $SiO_2$. However, when the coating solution contains a phosphorus source, the concentration of the silicon alkoxide may be 3 mass % to 30 mass %. When the concentration of the silicon alkoxide is excessively high in the coating film, cracks may occur that can cause the film to separate from the substrate.

At least a part of the phosphorus source may be phosphoric acid that is contained as at least a part of the strong acid. At least a part of the phosphorus source may be a phosphoester group that is contained in the hydrophilic organic polymer.

The concentration of the hydrophilic organic polymer should be:

c) 30 mass % or lower with respect to the $SiO_2$, in the case where the silicon alkoxide has a concentration of 9 mass % or lower in terms of the $SiO_2$ concentration, and d) (5A-15) mass % or lower where A denotes the $SiO_2$ concentration, in the case where the silicon alkoxide has a concentration exceeding 9 mass % in terms of the $SiO_2$ concentration.

When the concentration of the hydrophilic organic polymer is excessively low, the film stress caused by shrinkage during curing cannot be alleviated and thereby cracks may occur. Preferably, the concentration of the hydrophilic organic polymer is at least 0.1 mass %, particularly at least 5 mass % with respect to the $SiO_2$.

In the drying step of the process according to the present invention, at least a part of and preferably substantially all of the fluid components, such as water and alcohol, of the film-forming solution that has been applied to the substrate is removed.

According to the present invention, a thick organic-inorganic composite film with a thickness of, for example, more than 250 nm but not more than 5 µm, can be formed by carrying out each of the following steps once: a step of applying the film-forming solution and a step of removing at least a part of the fluid components contained in the film-forming solution that has been applied.

Examples of the strong acid to be used in the production process of the present invention include hydrochloric acid, nitric acid, trichloroacetic acid, trifluoroacetic acid, sulfuric acid, phosphoric acid, methanesulfonic acid, paratoluenesulfonic acid, and oxalic acid. Among strong acids, volatile acids can be used advantageously since they volatilize during heating and thus do not remain in the film that has been cured. It has been known that acid remaining in the film that has been cured may hinder binding of inorganic components and thereby may deteriorate the film hardness.

The organic-inorganic composite film of the present invention has a comparable film hardness to that of molten glass although it is heat-treated at a relatively lower temperature. This organic-inorganic composite film is suitable for practical use even when it is used for window glasses for automobiles or buildings.

A functional material can be introduced, with an organic-inorganic composite film that can be formed according to the present invention being used as a matrix. Even in the case of a functional material whose function is impaired when being subjected to a heat-treatment that is carried out at around 400° C. or higher, the functional material can be introduced into the organic-inorganic composite film, with the function thereof being not impaired.

Many of the organic materials that can be used as the functional material often start decomposing at temperatures of 200 to 300° C. For example, in the case of fine ITO (indium tin oxide) particles, which are oxides, the heat insulating property thereof deteriorates when they are heated at 250° C. or higher although they are an inorganic material.

In the present invention, the substrate can be heated when the fluid components are to be removed, if necessary. In this case, the temperature to be employed for heating the substrate should be adjusted suitably according to the heat resistance of the functional material. In the present invention, even if heating is carried out at 100 to 300° C., the organic-inorganic composite film can be cured sufficiently.

Hereinafter, the present invention is described further in detail using examples.

Example A1

In Example A1, a polyether phosphate surfactant was added to the coating solution (film-forming solution). The polyether phosphate surfactant also serves as a phosphorus source.

First, 45.14 g of tetraethoxysilane (manufactured by Shin-Etsu Chemical Co., Ltd.), 27.16 g of pure water, 0.1 g of concentrated hydrochloric acid (35 mass %, manufactured by KANTO CHEMICAL CO., INC.), and 3.9 g of a polyether phosphate surfactant (manufactured by Lubrizol Japan Ltd.; SOLSPERSE 41000) were added to 23.7 g of ethyl alcohol (manufactured by KATAYAMA CHEMICAL, Inc.). This was stirred and thus a film-forming solution was obtained.

With respect to this solution, the content (indicated in terms of silica) of silicon alkoxide (tetraethoxysilane), the proton concentration, the content of water, the content of an organic polymer (hydrophilic organic polymer), etc. are indicated in Table 1. The content of water was calculated to include water (0.35 mass %) contained in the ethyl alcohol. The proton concentration was calculated assuming that all the protons contained in the hydrochloric acid had dissociated. The same methods of calculating the water content and proton concentration as those described above are employed in all the examples and comparative examples described below.

"SOLSPERSE 41000" is a dispersant obtained by esterifying polyoxyethylene alkylether with phosphoric acid.

Subsequently, the film-forming solution was applied to a soda-lime-silicate glass substrate (100×100 mm) that had been washed, at a humidity (relative humidity) of 30% and at room temperature by a flow coating method. In this state, it was dried at room temperature for about 30 minutes. Thereafter, it was placed in an oven whose temperature had been raised to 200° C. beforehand and then was heated for 40 minutes. After that, it was cooled. The film thus obtained was a 2900-nm thick film that had high transparency and was free from cracks.

The hardness of the film was evaluated by the abrasion test according to JIS R 3212. That is, using a commercially available Taber abrasion tester (5150 ABRASER, manufactured by TABER INDUSTRIES), the film was subjected to abrasion 1000 times with a load of 500 g. The haze ratio was measured before and after the abrasion test. Table 2 indicates the film thickness, presence or absence of cracks, haze ratios that were obtained before and after the Taber test, and presence or absence of film separation after the Taber test. Table 2 also indicates the haze ratios that were obtained before and after the Taber test of a molten glass sheet, as a blank. The haze ratios were measured using HGM-2DP manufactured by SUGA TEST INSTRUMENTS Co., Ltd.

It was proved that the haze ratio was as low as 2.1% after the Taber test and it had comparable hardness to that of the molten glass sheet. This glass sheet with a silica film is highly useful even when it is used for window glasses for automobiles or buildings. For the window glass for automobiles, a haze ratio is required to be 4% or lower after the Taber test.

Example A2

In Example A2, ethyl silicate was used together with tetraethoxysilane, as silica raw materials.

First, 22.57 g of tetraethoxysilane (manufactured by Shin-Etsu Chemical Co., Ltd.), 16.25 g of Ethyl silicate 40 (manufactured by COLCOAT CO., LTD), 27.16 g of pure water, 0.1 g of concentrated hydrochloric acid (35 mass %, manufactured by KANTO CHEMICAL CO., INC.), and 3.9 g of a polyether phosphate surfactant (manufactured by Lubrizol Japan Ltd.; SOLSPERSE 41000) were added to 30.02 g of ethyl alcohol (manufactured by KATAYAMA CHEMICAL, Inc.). This was stirred and thus a film-forming solution was obtained. With respect to this solution, the proton concentration, etc. are indicated in Table 1.

"Ethyl silicate 40" used herein is expressed by the following formula (I) and is a transparent and colorless liquid containing 40 mass % of silica in terms of $SiO_2$. Furthermore, it contains condensates with a branch or cyclic structure in addition to condensates with a chain structure. A polymer of silicon alkoxide that is typified by "Ethyl silicate 40" is excellent in silica supply efficiency, viscosity, specific gravity, preservation stability, etc. It also is easy to handle when being used. Thus it can be used as a part or all of the silicon alkoxide.

$$CH_3CH_2O(Si(OCH_2CH_3)_2)_nOCH_2CH_3 \qquad (1)$$

In the above formula, the average value of n is 5.

Subsequently, the film-forming solution was applied to a soda-lime-silicate glass substrate (100×100 mm) that had been washed, at a humidity of 30% and at room temperature by the flow coating method. In this state, it was dried at ordinary temperature for about 30 minutes. Thereafter, it was placed in an oven whose temperature had been raised to 200°

C. beforehand and then was heated for 40 minutes. After that, it was cooled. The film thus obtained was a 2900-nm thick film that had high transparency and was free from cracks.

The hardness of the film was evaluated in the same manner as in Example A1. As shown in Table 2, the haze ratio was as low as 2.4% after the Taber test and it had a comparable hardness to that of the molten glass sheet.

Example A3

In Example A3, polyethylene glycol was used instead of the polyether phosphate surfactant and phosphoric acid was added as a raw material of phosphorus.

First, 45.14 g of tetraethoxysilane (manufactured by Shin-Etsu Chemical Co., Ltd.), 27.16 g of pure water, 0.1 g of concentrated hydrochloric acid (35 mass %, manufactured by KANTO CHEMICAL CO., INC.), 0.11 g of phosphoric acid (85 mass %, manufactured by KANTO CHEMICAL CO., INC.), and 3.81 g of polyethylene glycol 4000 (manufactured by KANTO CHEMICAL CO., INC.) were added to 23.69 g of ethyl alcohol (manufactured by KATAYAMA CHEMICAL, Inc.). This was stirred and thus a film-forming solution was obtained. With respect to this solution, the proton concentration, etc. are indicated in Table 1.

"Polyethylene glycol 4000" used herein is a polyethylene glycol having a weight-average molecular weight of 4000.

Subsequently, the film-forming solution was applied to a soda-lime-silicate glass substrate (100×100 mm) that had been washed, at a humidity of 30% and at room temperature by the flow coating method. In this state, it was dried at ordinary temperature for about 30 minutes. Thereafter, it was placed in an oven whose temperature had been raised to 200° C. beforehand and then was heated for 40 minutes. After that, it was cooled. The film thus obtained was a 3300-nm thick film that had high transparency and was free from cracks.

The hardness of the film was evaluated in the same manner as in Example A1. As shown in Table 2, the haze ratio was as low as 2.6% after the Taber test and it had a comparable hardness to that of the molten glass sheet.

Example A4

In Example A4, fine ITO particles were dispersed in an organic-inorganic composite film.

First, 0.15 g of a polyether phosphate surfactant (manufactured by Kusumoto Chemicals, Ltd.; DISPARLON DA-375), 20.8 g of tetraethoxysilane (manufactured by Shin-Etsu Chemical Co., Ltd.), 55.45 g of ethyl alcohol (manufactured by KATAYAMA CHEMICAL, Inc.), 15.8 g of pure water, and 0.3 g of concentrated hydrochloric acid (35 mass %, manufactured by KANTO CHEMICAL CO., INC.) were added sequentially to 7.5 g of a fine ITO particle dispersant (manufactured by Mitsubishi Materials Corporation; an ethyl alcohol solution containing 40 mass % of ITO). Thus a film-forming solution was obtained. With respect to this solution, the proton concentration, etc. are indicated in Table 1.

"DISPARLON DA-375" is a dispersant obtained by esterifying polyoxyethylene alkylether with phosphoric acid.

Subsequently, the film-forming solution was applied to a soda-lime-silicate glass substrate (100×100 mm) that had been washed, at a humidity of 30% and at room temperature by the flow coating method. In this state, it was dried at ordinary temperature for about 30 minutes. Thereafter, it was placed in an oven whose temperature had been raised to 90° C. beforehand and then was heated for 30 minutes. Furthermore, it was placed in an oven whose temperature had been raised to 200° C. beforehand and then was heated for one hour. After that, it was cooled. The film thus obtained was a 1000-nm thick film that had high transparency and was free from cracks.

The hardness of the film was evaluated in the same manner as in Example A1. As shown in Table 2, the haze ratio was as low as 2.8% after the Taber test and it had a comparable hardness to that of the molten glass sheet.

This organic-inorganic composite film contains 3 mass % of fine ITO particles.

Example A5

Similarly in Example A5, fine ITO particles were dispersed in an organic-inorganic composite film.

First, 0.16 g of a polyether phosphate surfactant (manufactured by Avecia Limited; SOLSPERSE 41000), 0.36 g of polyethylene glycol 400 (manufactured by KATAYAMA CHEMICAL, Inc.), 6.25 g of tetraethoxysilane (manufactured by Shin-Etsu Chemical Co., Ltd.), 17.59 g of ethyl alcohol (manufactured by KATAYAMA CHEMICAL, Inc.), 3.7 g of pure water, and 0.01 g of concentrated hydrochloric acid (60 mass %, manufactured by KANTO CHEMICAL CO., INC.) were added sequentially to 2.25 g of a fine ITO particle dispersant (manufactured by Mitsubishi Materials Corporation; an ethyl alcohol solution containing 40 mass % of ITO). Thus a film-forming solution was obtained. With respect to this solution, the proton concentration, etc. are indicated in Table 1.

"Polyethylene glycol 400" used herein is a polyethylene glycol having a weight-average molecular weight of 400.

Subsequently, the film-forming solution was applied to a soda-lime-silicate glass substrate (305×305 mm) that had been washed, at a humidity of 30% and at room temperature by the flow coating method. In this state, it was dried at ordinary temperature for about 30 minutes. Thereafter, it was placed in an oven whose temperature had been raised to 200° C. beforehand and then was heated for 14 minutes. After that, it was cooled. The film thus obtained was a 1000-nm thick film that had high transparency and was free from cracks.

The hardness of the film was evaluated in the same manner as in Example A1. As shown in Table 2, the haze ratio was as low as 2.4% after the Taber test and it had a comparable hardness to that of the molten glass sheet.

This organic-inorganic composite film contains 3 mass % of fine ITO particles.

The films obtained in Examples A4 and A5 contain the fine ITO particles. Hence, they each have a function of filtering out the infrared rays in sunlight to reduce the heat that is sensed by skin when sunlight shines on the skin through ordinary glass.

Generally, when the fine ITO particles are exposed to a temperature of 250° C. or higher, they are oxidized and thereby the function of filtering out the infrared rays deteriorates. In Examples A4 and A5, since the heating was carried out at a temperature of 200° C. or lower, silica films were obtained that maintained the function of shielding infrared rays that is provided by the fine ITO particles.

Comparative Example A6

In Comparative Example A6, polyethylene glycol was used instead of the polyether phosphate surfactant used in Example A1. No phosphorus source was added.

First, 45.14 g of tetraethoxysilane (manufactured by Shin-Etsu Chemical Co., Ltd.), 27.16 g of pure water, 0.1 g of concentrated hydrochloric acid (35 mass %, manufactured by KANTO CHEMICAL CO., INC.), and 3.9 g of polyethylene glycol 400 (manufactured by KANTO CHEMICAL CO., INC.) were added to 23.7 g of ethyl alcohol (manufactured by KATAYAMA CHEMICAL, Inc.). This was stirred and thus a film-forming solution was obtained. With respect to this solution, the proton concentration, etc. are indicated in Table 1.

Subsequently, the film-forming solution was applied to a soda-lime-silicate glass substrate (100×100 mm) that had been washed, at a humidity of 30% and at room temperature by the flow coating method. In this state, it was dried at ordinary temperature for about 30 minutes. Thereafter, it was placed in an oven whose temperature had been raised to 200° C. beforehand and then was heated for 40 minutes. After that, it was cooled. The film thus obtained was a 2800-nm thick film that had high transparency and was free from cracks.

The hardness of the film was evaluated in the same manner as in Example A1. Consequently, as shown in Table 2, the film separated from the substrate partially after the Taber test.

When the film thickness exceeded 2 μm, it was not possible to improve the mechanical strength of the film to an extent that allowed the film to withstand the Taber abrasion test unless a phosphorus source was added to the film-forming solution.

Comparative Example A7

In Comparative Example A7, phosphoric acid was used instead of the polyether phosphate surfactant used in Example A1. No hydrophilic organic polymer was added.

First, 45.14 g of tetraethoxysilane (manufactured by Shin-Etsu Chemical Co., Ltd.), 27.16 g of pure water, 0.1 g of concentrated hydrochloric acid (35 mass %, manufactured by KANTO CHEMICAL CO., INC.), and 0.11 g of phosphoric acid (85 mass %, manufactured by KANTO CHEMICAL CO., INC.) were added to 27.49 g of ethyl alcohol (manufactured by KATAYAMA CHEMICAL, Inc.). This was stirred and thus a film-forming solution was obtained. With respect to this solution, the proton concentration, etc. are indicated in Table 1.

Subsequently, the film-forming solution was applied to a soda-lime-silicate glass substrate (100×100 mm) that had been washed, at a humidity of 30% and at room temperature by the flow coating method. In this state, it was dried at ordinary temperature for about 30 minutes. Thereafter, it was placed in an oven whose temperature had been raised to 200° C. beforehand and then was heated for 40 minutes. After that, it was cooled. As a result, cracks accompanied by separation occurred and thus no practical film was obtained.

Example B1

In Example B1, the proton concentration was increased while a polyether phosphate surfactant and polyethylene glycol were added to the film-forming solution.

First, 6.25 g of tetraethoxysilane (manufactured by Shin-Etsu Chemical Co., Ltd.), 5.68 g of pure water, 0.3 g of concentrated hydrochloric acid (35 mass %, manufactured by KANTO CHEMICAL CO., INC.), 0.23 g of a polyether phosphate surfactant (manufactured by Lubrizol Japan Ltd.; SOLSPERSE 41000), and 0.04 g of polyethylene glycol 200 (manufactured by KANTO CHEMICAL CO., INC.) were added to 17.5 g of ethyl alcohol (manufactured by KATAYAMA CHEMICAL, Inc.). This was stirred and thus a coating solution was obtained. With respect to this solution, the proton concentration, etc. are indicated in Table 3.

"Polyethylene glycol 200" used herein is a polyethylene glycol having a weight-average molecular weight of 200.

Subsequently, the coating solution was applied to a soda-lime-silicate glass substrate (305×305 mm) that had been washed, at a humidity of 30% and at room temperature by the flow coating method. In this state, it was air-dried at room temperature for about five minutes. Thereafter, it was placed in an oven whose temperature had been raised to 200° C. beforehand and then was heated for 12 minutes. After that, it was cooled.

The film thus obtained had a thickness of 800 nm but cracks accompanied by separation had occurred in approximately half the in-plane region. Subsequently, the region other than that where separation had occurred was subjected to the abrasion resistance test. Table 4 indicates characteristics of the film formed as described above.

The haze ratio was as low as 0.7% after the Taber test. The difference between the haze ratios that were obtained before and after the test was very small. Thus it was proved that the film had high hardness.

Example B2

In Example B2, the proton concentration was allowed to be slightly lower than that of Example B1 while a polyether phosphate surfactant and polyethylene glycol were added to the film-forming solution.

First, 6.25 g of tetraethoxysilane (manufactured by Shin-Etsu Chemical Co., Ltd.), 5.78 g of pure water, 0.15 g of concentrated hydrochloric acid (35 mass %, manufactured by KANTO CHEMICAL CO., INC.), 0.23 g of a polyether phosphate surfactant (manufactured by Lubrizol Japan Ltd.; SOLSPERSE 41000), and 0.04 g of polyethylene glycol 200 (manufactured by KANTO CHEMICAL CO., INC.) were added to 17.55 g of ethyl alcohol (manufactured by KATAYAMA CHEMICAL, Inc.). This was stirred and thus a coating solution was obtained. With respect to this solution, the proton concentration, etc. are indicated in Table 3.

Subsequently, the coating solution was applied to a soda-lime-silicate glass substrate (305×305 mm) that had been washed, at a humidity of 30% and at room temperature by the flow coating method. In this state, it was air-dried at room temperature for about five minutes. Thereafter, it was placed in an oven whose temperature had been raised to 200° C. beforehand and then was heated for 12 minutes. After that, it was cooled.

The film thus obtained had a thickness of 800 nm but cracks accompanied by separation had occurred partially in the film. The cracks occurred in the region extending up to 50 mm from the lower side of the substrate to which the solution had been applied, with the substrate being tilted. Conceivably, cracks tended to occur due to the increase in thickness of the film on the lower side of the substrate. The region where no cracks accompanied by separation had occurred was subjected to the Taber abrasion test. Table 4 indicates characteristics of the film formed as described above.

The haze ratio was as low as 2.4% after the Taber test. The difference between the haze ratios that were obtained before and after the test was very small. Thus it was proved that the film had high hardness.

Example B3

In Example B3, the proton concentration was lowered while a polyether phosphate surfactant and polyethylene glycol were added to the film-forming solution.

First, 6.25 g of tetraethoxysilane (manufactured by Shin-Etsu Chemical Co., Ltd.), 5.88 g of pure water, 0.003 g of concentrated hydrochloric acid (35 mass %, manufactured by KANTO CHEMICAL CO., INC.), 0.23 g of a polyether phosphate surfactant (manufactured by Lubrizol Japan Ltd.; SOLSPERSE 41000), and 0.04 g of polyethylene glycol 200 (manufactured by KANTO CHEMICAL CO., INC.) were added to 17.6 g of ethyl alcohol (manufactured by KATAYAMA CHEMICAL, Inc.). This was stirred and thus a coating solution was obtained. With respect to this solution, the proton concentration, etc. are indicated in Table 3.

Subsequently, the coating solution was applied to a soda-lime-silicate glass substrate (305×305 mm) that had been washed, at a humidity of 30% and at room temperature by the flow coating method. In this state, it was air-dried at room temperature for about five minutes. Thereafter, it was placed in an oven whose temperature had been raised to 200° C. beforehand and then was heated for 12 minutes. After that, it was cooled. The film thus obtained was a 700-nm thick film that was transparent without having haze. No cracks accompanied by separation were observed. Table 4 indicates characteristics of the film formed as described above.

After the Taber test, separation of the film was not observed. The haze ratio was as low as 2.2% after the Taber test. The difference between the haze ratios that were obtained before and after the test was very small. Thus it was proved that the film had high hardness.

With reference to the results of Examples B1 to B3, cracks tend to occur in the film when the proton concentration is excessively high. Accordingly, it is preferable that the proton concentration be 0.09 mol/kg or lower, particularly 0.04 mol/kg or lower.

Example B4

In Example B4, the proton concentration further was lowered while a polyether phosphate surfactant and polyethylene glycol were added to the film-forming solution.

First, 6.25 g of tetraethoxysilane (manufactured by Shin-Etsu Chemical Co., Ltd.), 5.88 g of pure water, 0.0003 g of concentrated hydrochloric acid (35 mass %, manufactured by KANTO CHEMICAL CO., INC.), 0.23 g of a polyether phosphate surfactant (manufactured by Lubrizol Japan Ltd.; SOLSPERSE 41000), and 0.04 g of polyethylene glycol 200 (manufactured by KANTO CHEMICAL CO., INC.) were added to 17.6 g of ethyl alcohol (manufactured by KATAYAMA CHEMICAL, Inc.). This was stirred and thus a coating solution was obtained. With respect to this solution, the proton concentration, etc. are indicated in Table 3.

Subsequently, the coating solution was applied to a soda-lime-silicate glass substrate (305×305 mm) that had been washed, at a humidity of 30% and at room temperature by the flow coating method. In this state, it was air-dried at room temperature for about five minutes. Thereafter, it was placed in an oven whose temperature had been raised to 200° C. beforehand and then was heated for 12 minutes. After that, it was cooled. The film thus obtained was a 800-nm thick film having high transparency. No cracks accompanied by separation were observed. Table 4 indicates characteristics of the film formed as described above.

After the Taber test, separation of the film was not observed. The haze ratio was as low as 2.3% after the Taber test. The difference between the haze ratios that were obtained before and after the test was very small. Thus it was proved that the film had high hardness.

Comparative Example B5

In Comparative Example B5, the proton concentration was increased excessively while a polyether phosphate surfactant and polyethylene glycol were added to the film-forming solution.

First, 6.25 g of tetraethoxysilane (manufactured by Shin-Etsu Chemical Co., Ltd.), 5.29 g of pure water, 0.9 g of concentrated hydrochloric acid (35 mass %, manufactured by KANTO CHEMICAL CO., INC.), 0.23 g of a polyether phosphate surfactant (manufactured by Lubrizol Japan Ltd.; SOLSPERSE 41000), and 0.04 g of polyethylene glycol 200 (manufactured by KANTO CHEMICAL CO., INC.) were added to 17.29 g of ethyl alcohol (manufactured by KATAYAMA CHEMICAL, Inc.). This was stirred and thus a coating solution was obtained. With respect to this solution, the proton concentration, etc. are indicated in Table 3.

Subsequently, the coating solution was applied to a soda-lime-silicate glass substrate (305×305 mm) that had been washed, at a humidity of 30% and at room temperature by the flow coating method. In this state, it was air-dried at room temperature for about five minutes. Thereafter, it was placed in an oven whose temperature had been raised to 200° C. beforehand and then was heated for 12 minutes. After that, it was cooled.

The film thus obtained had a thickness of 800 nm but cracks accompanied by separation had occurred almost throughout the entire surface. Hence, it was not possible to determine the characteristics of the film.

Example C1

In Example C1, polyethylene glycol was added to the film-forming solution. No phosphorus source such as phosphoric acid was added.

Using the same raw materials as those used in Example 1, a film was formed in the same manner as in Example B1 except that no polyether phosphate surfactant was added. The amounts of the raw materials were adjusted so that the concentration indicated in Table 5 was obtained.

The film thus obtained was a 700-nm thick film having high transparency but cracks accompanied by separation had occurred partially in the film. The region where no cracks accompanied by separation had occurred was subjected to the Taber abrasion test. Separation of the film was not observed after the Taber abrasion test. The results are indicated in Table 6.

Example C2

In Example C2, the proton concentration was lowered slightly from that of Example C1. Similarly in Example C2, polyethylene glycol was added but no phosphorus source such as phosphoric acid was added.

Using the same raw materials as those used in Example B1, a film was formed in the same manner as in Example B1 except that no polyether phosphate surfactant was added. The amounts of the raw materials were adjusted so that the concentration indicated in Table 5 was obtained.

The film thus obtained was a 700-nm thick film having high transparency. No cracks accompanied by separation were observed. The Taber abrasion test was carried out with respect to the film. As a result, separation of the film was not observed after the Taber abrasion test. The results are indicated in Table 6.

Example C3

In Example C3, the proton concentration further was lowered from that of Example C2. Similarly in Example C3, polyethylene glycol was added but no phosphorus source such as phosphoric acid was added.

Using the same raw materials as those used in Example B1, a film was formed in the same manner as in Example B1 except that no polyether phosphate surfactant was added. The amounts of the raw materials were adjusted so that the concentration indicated in Table 5 was obtained.

The film thus obtained was a 700-nm thick film having high transparency. No cracks accompanied by separation were observed. The Taber abrasion test was carried out with respect to the film. As a result, separation of the film was not observed after the Taber abrasion test. The results are indicated in Table 6.

With reference to the results of Examples C1 to C3, it is understood that similarly to the case of using a coating solution to which no phosphorus source is added, a proton concentration of 0.09 mol/kg or lower is particularly preferable in order to prevent the film from cracking.

Comparative Example C4

In Comparative Example C4, the proton concentration further was lowered from that of Example C3. Similarly in Comparative Example C4, polyethylene glycol was added but no phosphorus source such as phosphoric acid was added.

Using the same raw materials as those used in Example B1, a film was formed in the same manner as in Example B1 except that no polyether phosphate surfactant was added. The amounts of the raw materials were adjusted so that the concentration indicated in Table 5 was obtained.

In this comparative example, however, the coating solution was repelled from the substrate. Accordingly, it was not possible to form a film. Conceivably, this is because the acid concentration was too low and therefore hydrolysis of silicon alkoxide did not progress sufficiently in the solution.

In Example B4, although the proton concentration was the same as that in Comparative Example C4, application of the coating solution was possible. Especially, when no phosphorus source is contained in the coating solution, it is preferable that the proton concentration be adjusted to be at least 0.001 mol/kg and thereby the hydrolysis of silicon alkoxide contained in the solution be allowed to progress to a certain degree.

Example D1

In Example D1, a polyether phosphate surfactant and polyethylene glycol were added to the film-forming solution.

A film was formed in the same manner as in Example B1 using the same raw materials as those used in Example B1. The amounts of the raw materials were adjusted so that the concentration indicated in Table 7 was obtained. The amounts of the polyether phosphate surfactant (manufactured by Lubrizol Japan Ltd.; SOLSPERSE 41000) and polyethylene glycol 200 (manufactured by KANTO CHEMICAL CO., INC.) to be added were the same as those employed in Example B1.

The film thus obtained was a 700-nm thick film having high transparency. No cracks accompanied by separation were observed. The Taber abrasion test was carried out with respect to the film. As a result, separation of the film was not observed after the Taber abrasion test. The results are indicated in Table 8.

Example D2

In Example D2, the water content was reduced as compared to that employed in Example D1. Similarly in Example D2, a polyether phosphate surfactant and polyethylene glycol were added.

A film was formed in the same manner as in Example B1 using the same raw materials as those used in Example B1. The amounts of the raw materials were adjusted so that the concentration indicated in Table 7 was obtained. The amounts of the polyether phosphate surfactant (manufactured by Lubrizol Japan Ltd.; SOLSPERSE 41000) and polyethylene glycol 200 (manufactured by KANTO CHEMICAL CO., INC.) to be added were the same as those employed in Example B1.

The film thus obtained was a 600-nm thick film having high transparency. No cracks accompanied by separation were observed. The Taber abrasion test was carried out with respect to the film. As a result, separation of the film was not observed after the Taber abrasion test. The results are indicated in Table 8.

Comparative Example D3

In Comparative Example D3, the water content was reduced as compared to that employed in Example D2. Similarly in Comparative Example D3, a polyether phosphate surfactant and polyethylene glycol were added.

A film was formed in the same manner as in Example B1 using the same raw materials as those used in Example B1. The amounts of the raw materials were adjusted so that the concentration indicated in Table 7 was obtained. The amounts of the polyether phosphate surfactant (manufactured by Lubrizol Japan Ltd.; SOLSPERSE 41000) and polyethylene glycol 200 (manufactured by KANTO CHEMICAL CO., INC.) to be added were the same as those employed in Example B1.

The film thus obtained was a 600-nm thick film having high transparency. No cracks accompanied by separation were observed. The Taber abrasion test was carried out with respect to the film. The film was separated after the Taber abrasion test. The results are indicated in Table 8.

With reference to the results of Examples D1 to D3 and Comparative Example D4, it is understood that the water content should be adjusted so that the number of moles of water is at least four times the number of moles of silicon atoms contained in silicon alkoxide.

Example E1

In Example E1, the proton concentration was increased slightly while fine ITO particles were added. A polyether phosphate surfactant and polyethylene glycol were added to the film-forming solution.

First, 6.25 g of tetraethoxysilane (manufactured by Shin-Etsu Chemical Co., Ltd.), 5.69 g of pure water, 0.3 g of concentrated hydrochloric acid (35 mass %, manufactured by KANTO CHEMICAL CO., INC.), 0.23 g of a polyether phosphate surfactant (manufactured by Lubrizol Japan Ltd.; SOLSPERSE 41000), and 0.04 g of polyethylene glycol 200 (manufactured by KANTO CHEMICAL CO., INC.) were added to 15.24 g of ethyl alcohol (manufactured by KATAYAMA CHEMICAL, Inc.). This was stirred. Furthermore, 2.25 g of a fine ITO particle dispersant (manufactured by Mitsubishi Materials Corporation; an ethyl alcohol solution containing 40 mass % of ITO) was added thereto. The coating solution became clouded due to the addition of the fine ITO particle dispersant. The proton concentration, water content, etc. are indicated in Table 9.

Subsequently, the coating solution was applied to a soda-lime-silicate glass substrate (305×305 mm) that had been washed, at a humidity of 30% and at room temperature by the flow coating method. In this state, it was air-dried at room temperature for about five minutes. Thereafter, it was placed in an oven whose temperature had been raised to 200° C. beforehand and then was heated for 12 minutes. After that, it was cooled.

The film thus obtained was a 1300-nm thick film having high transparency. No cracks accompanied by separation were observed. The Taber abrasion test was carried out with respect to the film. Separation of the film was not observed after the Taber abrasion test. The results are indicated in Table 10.

However, the haze ratios were high before and after the Taber abrasion test. Accordingly, the film lacked transparency.

Example E2

In Example E2, the proton concentration was lowered slightly from that employed in Example E1 while fine ITO particles were added. A polyether phosphate surfactant and polyethylene glycol were added to the film-forming solution.

First, 6.25 g of tetraethoxysilane (manufactured by Shin-Etsu Chemical Co., Ltd.), 5.69 g of pure water, 0.15 g of concentrated hydrochloric acid (35 mass %, manufactured by KANTO CHEMICAL CO., INC.), 0.23 g of a polyether phosphate surfactant (manufactured by Lubrizol Japan Ltd.; SOLSPERSE 41000), and 0.04 g of polyethylene glycol 200 (manufactured by KANTO CHEMICAL CO., INC.) were added to 15.42 g of ethyl alcohol (manufactured by KATAYAMA CHEMICAL, Inc.). This was stirred. Furthermore, 2.25 g of a fine ITO particle dispersant (manufactured by Mitsubishi Materials Corporation; an ethyl alcohol solution containing 40 mass % of ITO) was added thereto. The coating solution became clouded due to the addition of the fine ITO particle dispersant. The proton concentration, water content, etc. are indicated in Table 9.

Subsequently, the coating solution was applied to a soda-lime-silicate glass substrate (305×305 mm) that had been washed, at a humidity of 30% and at room temperature by the flow coating method. In this state, it was air-dried at room temperature for about five minutes. Thereafter, it was placed in an oven whose temperature had been raised to 200° C. beforehand and then was heated for 12 minutes. After that, it was cooled.

The film thus obtained was a 1300-nm thick film having high transparency. No cracks accompanied by separation were observed. The Taber abrasion test was carried out with respect to the film. As a result, separation of the film was not observed after the Taber abrasion test. The results are indicated in Table 10.

The film was clouded as in the case of Example E1. However, this film was not clouded as much as the film obtained in Example E2, before the Taber abrasion test.

With reference to the results of Examples E1 and E2 as well as Examples A4 and A5, it is understood that a proton concentration of 0.03 mol/kg or lower is preferable when fine particles are added to the coating solution.

The examples and comparative examples described above are mere examples for explaining the present invention. The present invention is not limited to these examples.

For instance, tetramethoxysilane, methyl silicate, etc. can be used as silicon alkoxide.

Furthermore, an organically modified alkoxide may be used as silicon alkoxide. In this case, however, it is preferable that the amount of organically modified silicon alkoxide be 10% or less of the number of moles of silicon atoms contained in silicon alkoxide that are not organically modified.

Strong acid to be used herein can be sulfuric acid, p-sulfonic acid, methanesulfonic acid, etc.

Alcohol to be used herein can be methyl alcohol, 1-propyl alcohol, isopropyl alcohol, t-butyl alcohol, etc.

In addition, surfactants and organic materials that are not described above as examples also may be added if necessary.

The film of the present invention is characterized in that organic materials can be added. With the use of this, various organic materials that are not limited to hydrophilic organic polymers can be added to provide the film with functions derived from the organic materials added thereto. Furthermore, various functional fine particles also may be added.

Furthermore, metal oxides other than silica may be added to the film of the present invention.

For instance, chlorides, oxides, or nitrates of metals such as lithium, sodium, potassium, cesium, magnesium, calcium, cobalt, iron, nickel, copper, aluminum, gallium, indium, scandium, yttrium, lanthanum, cerium, zinc, etc. may be added to the coating solution.

With respect to boron, it is possible to add boric acid or alkoxide of boron that has been chelated with beta-diketone such as acetylacetone.

With respect to titanium and zirconium, oxychloride, oxynitrate, or alkoxide that has been chelated with beta-diketone can be added.

With respect to aluminum, it is possible to add alkoxide that has been chelated with beta-diketone.

The hydrophilic organic polymer is not limited to the examples described above. Surfactants having polyoxyalkylene groups, polyethers having hydrophilic terminals, etc. can be used extensively. Polypropylene glycol may be used instead of polyethylene glycol.

As in Example A3, phosphoric acid may be used as a phosphorus source.

Phosphoric acid surfactants having polyether groups also have a function of improving dispersibility of fine particles in the coating solution.

However, when an excessively large amount of a hydrophilic organic polymer such as a surfactant is added, the film hardness decreases. As a result of various experiments, it was proved that the suitable amount of the hydrophilic organic polymer was in the ranges mentioned in c) and d) described above.

TABLE 1

|  | Silicon Alkoxide (in terms of SiO$_2$; mass %) | Proton Concentration (mol/kg) | Water (to Si Content; mole ratio) | Organic Polymer (to SiO$_2$ Content; mass %) | Phosphorus | Fine Particles |
|---|---|---|---|---|---|---|
| Example A1 | 13.0 | 0.01 | 7 | 30 | Yes | None |
| Example A2 | 13.0 | 0.01 | 7 | 30 | Yes | None |
| Example A3 | 13.0 | 0.01 | 7 | 29 | Yes | None |
| Example A4 | 6.0 | 0.029 | 9 | 2.5 | Yes | ITO |
| Example A5 | 6.0 | 0.003 | 7 | 25 | Yes | ITO |
| Comparative Example A6 | 13.0 | 0.01 | 7 | 30 | None | None |
| Comparative Example A7 | 13.0 | 0.01 | 7 | 0 | Yes | None |

TABLE 2

|  | Film Thickness (nm) | Presence of Cracks | Initial Haze Ratio (%) | Haze Ratio after Taber Test (%) | Film Separation after Taber Test |
|---|---|---|---|---|---|
| Example A1 | 2900 | No | 0.2 | 2.1 | No |
| Example A2 | 2900 | No | 0.1 | 2.4 | No |
| Example A3 | 3300 | No | 0.1 | 2.6 | No |
| Example A4 | 1000 | No | 0.0 | 2.8 | No |
| Example A5 | 1000 | No | 0.2 | 2.4 | No |
| Comparative Example A6 | 2800 | No | 0.2 | 2.3 | Yes |
| Comparative Example A7 | — | Yes (Whole Surface) | — | — | — |
| Glass Sheet | — | — | 0.0 | 1.5 | — |

TABLE 3

|  | Silicon Alkoxide (in terms of SiO$_2$; mass %) | Proton Concentration (mol/kg) | Water (to Si Content; mole ratio) | Organic Polymer (to SiO$_2$ Content; mass %) | Phosphorus | Fine Particles |
|---|---|---|---|---|---|---|
| Example B1 | 6.0 | 0.096 | 11 | 15 | Yes | None |
| Example B2 | 6.0 | 0.048 | 11 | 15 | Yes | None |
| Example B3 | 6.0 | 0.001 | 11 | 15 | Yes | None |
| Example B4 | 6.0 | 0.0001 | 11 | 15 | Yes | None |
| Comparative Example B5 | 6.0 | 0.288 | 11 | 15 | Yes | None |

TABLE 4

|  | Film Thickness (nm) | Presence of Cracks | Initial Haze Ratio (%) | Haze Ratio after Taber Test (%) | Film Separation after Taber Test |
|---|---|---|---|---|---|
| Example B1 | 800 | Yes | 0.1 | 0.7 | No |
| Example B2 | 800 | Yes | 0.2 | 2.4 | No |
| Example B3 | 700 | No | 0.3 | 2.2 | No |
| Example B4 | 800 | No | 0.3 | 2.3 | No |
| Comparative Example B5 | 800 | Yes (Whole Surface) | — | — | — |

TABLE 5

|  | Silicon Alkoxide (in terms of SiO$_2$; mass %) | Proton Concentration (mol/kg) | Water (to Si Content; mole ratio) | Organic Polymer (to SiO$_2$ Content; mass %) | Phosphorus | Fine Particles |
|---|---|---|---|---|---|---|
| Example C1 | 6.0 | 0.096 | 11 | 22.5 | None | None |
| Example C2 | 6.0 | 0.01 | 11 | 22.5 | None | None |
| Example C3 | 6.0 | 0.001 | 11 | 22.5 | None | None |
| Comparative Example C4 | 6.0 | 0.0001 | 11 | 22.5 | None | None |

TABLE 6

|  | Film Thickness (nm) | Presence of Cracks | Film Separation after Taber Test |
|---|---|---|---|
| Example C1 | 700 | Yes | No |
| Example C2 | 700 | No | No |
| Example C3 | 700 | No | No |
| Comparative Example C4 | — | — | — |

TABLE 7

|  | Silicon Alkoxide (in terms of SiO$_2$; mass %) | Proton Concentration (mol/kg) | Water (to Si Content; mole ratio) | Organic Polymer (to SiO$_2$ Content; mass %) | Phosphorus | Fine Particles |
|---|---|---|---|---|---|---|
| Example D1 | 6.0 | 0.012 | 7 | 15 | Yes | None |
| Example D2 | 6.0 | 0.012 | 4 | 15 | Yes | None |
| Comparative Example D3 | 6.0 | 0.012 | 2.5 | 15 | Yes | None |

TABLE 8

|  | Film Thickness (nm) | Presence of Cracks | Film Separation after Taber Test |
|---|---|---|---|
| Example D1 | 700 | No | No |
| Example D2 | 600 | No | No |
| Comparative Example D3 | 600 | No | Yes |

TABLE 9

|  | Silicon Alkoxide (in terms of SiO$_2$; mass %) | Proton Concentration (mol/kg) | Water (to Si Content; mole ratio) | Organic Polymer (to SiO$_2$ Content; mass %) | Phosphorus | Fine Particles |
|---|---|---|---|---|---|---|
| Example E1 | 6.0 | 0.098 | 11 | 15 | Yes | ITO |
| Example E2 | 6.0 | 0.05 | 11 | 15 | Yes | ITO |

TABLE 10

| | Film Thickness (nm) | Presence of Cracks | Initial Haze Ratio (%) | Haze Ratio after Taber Test (%) | Film Separation after Taber Test |
|---|---|---|---|---|---|
| Example E1 | 1300 | No | 6.5 | 6.2 | No |
| Example E2 | 1300 | No | 3.6 | 6.5 | No |

The invention claimed is:

1. An article with an organic-inorganic composite film, the article comprising a substrate and an organic-inorganic composite film that is formed on a surface of the substrate and comprises an organic material and an inorganic oxide,
wherein the organic-inorganic composite film contains a network structure of silica in a form of siloxane polymer as the inorganic oxide,
the organic-inorganic composite film contains the silica as its main component,
the organic-inorganic composite film contains a hydrophilic organic polymer as the organic material in the network structure of silica,
the organic-inorganic composite film is a single-layer film and an outermost layer,
the organic-inorganic composite film is formed directly on a substrate, wherein the substrate is a glass sheet,
the organic-inorganic composite film has a thickness of more than 250 nm and no more than 5 μm, and
the organic-inorganic composite film does not separate from the substrate after the Taber abrasion test prescribed in Japanese Industrial Standards R 3212 that is carried out with respect to a surface of the organic-inorganic composite film, the Taber abrasion test being carried out at a rotation number of 1000 with a load of 500 g being applied.

2. The article according to claim 1, wherein the organic-inorganic composite film has a thickness of more than 300 nm but no more than 5 μm.

3. The article according to claim 2, wherein the organic-inorganic composite film has a thickness of 1 μm to 5 μm.

4. The article according to claim 1, wherein a portion that has been subjected to the Taber abrasion test has a haze ratio of 4% or lower after the Taber abrasion test.

5. The article according to claim 1, wherein the organic-inorganic composite film contains phosphorus.

6. The article according to claim 1, wherein the hydrophilic organic polymer includes a polyoxyalkylene group.

7. The article according to claim 1, wherein the organic-inorganic composite film contains fine particles.

8. The article according to claim 7, wherein the content of the fine particles is at least 1 mass %, and a portion that has been subjected to the Taber abrasion test has a haze ratio of 4% or lower after the Taber abrasion test.

9. An article with an organic-inorganic composite film, the article comprising a substrate and an organic-inorganic composite film that is formed on a surface of the substrate comprises an organic material and an inorganic oxide,
wherein the organic-inorganic composite film contains a network structure of silica in a form of siloxane polymer as the inorganic oxide,
the organic-inorganic composite film contains the silica as its main component,
the organic-inorganic composite film contains no fine particles,
the organic-inorganic composite film contains the organic material in the network structure of silica,
the organic-inorganic composite film is a single-layer film and an outermost layer,
the organic-inorganic composite film is formed directly on a substrate, wherein the substrate is a glass sheet,
the organic-inorganic composite film has a thickness of more than 250 nm and no more than 5 μm, and
the organic-inorganic composite film does not separate from the substrate after the Taber abrasion test prescribed in Japanese Industrial Standards R 3212 that is carried out with respect to a surface of the organic-inorganic composite film, the Taber abrasion test being carried out at a rotation number of 1000 with a load of 500 g being applied.

10. The article according to claim 1, wherein the hydrophilic organic polymer is a polyether phosphate surfactant.

11. An article with an organic-inorganic composite film, the article comprising a substrate and an organic-inorganic composite film that is formed on a surface of the substrate and comprises an organic material and an inorganic oxide,
wherein the organic-inorganic composite film contains a network structure of silica in a form of siloxane polymer as the inorganic oxide,
the organic-inorganic composite film contains the silica as its main component,
the organic-inorganic composite film contains a hydrophilic organic polymer as the organic material in the network structure of silica, wherein the hydrophilic organic polymer is a polyether phosphate surfactant,
the organic-inorganic composite film has a thickness of more than 250 nm and no more than 5 and μm, and
the organic-inorganic composite film does not separate from the substrate after the Taber abrasion test prescribed in Japanese Industrial Standards R 3212 that is carried out with respect to a surface of the organic-inorganic composite film, the Taber abrasion test being carried out at a rotation number of 1000 with a load of 500 g being applied.

* * * * *